Nov. 25, 1952 T. R. SYKES 2,619,027
AUTOMATIC FEEDER FOR FEEDING MATERIAL
OR ARTICLES THROUGH MACHINES
Filed April 8, 1948 6 Sheets-Sheet 1
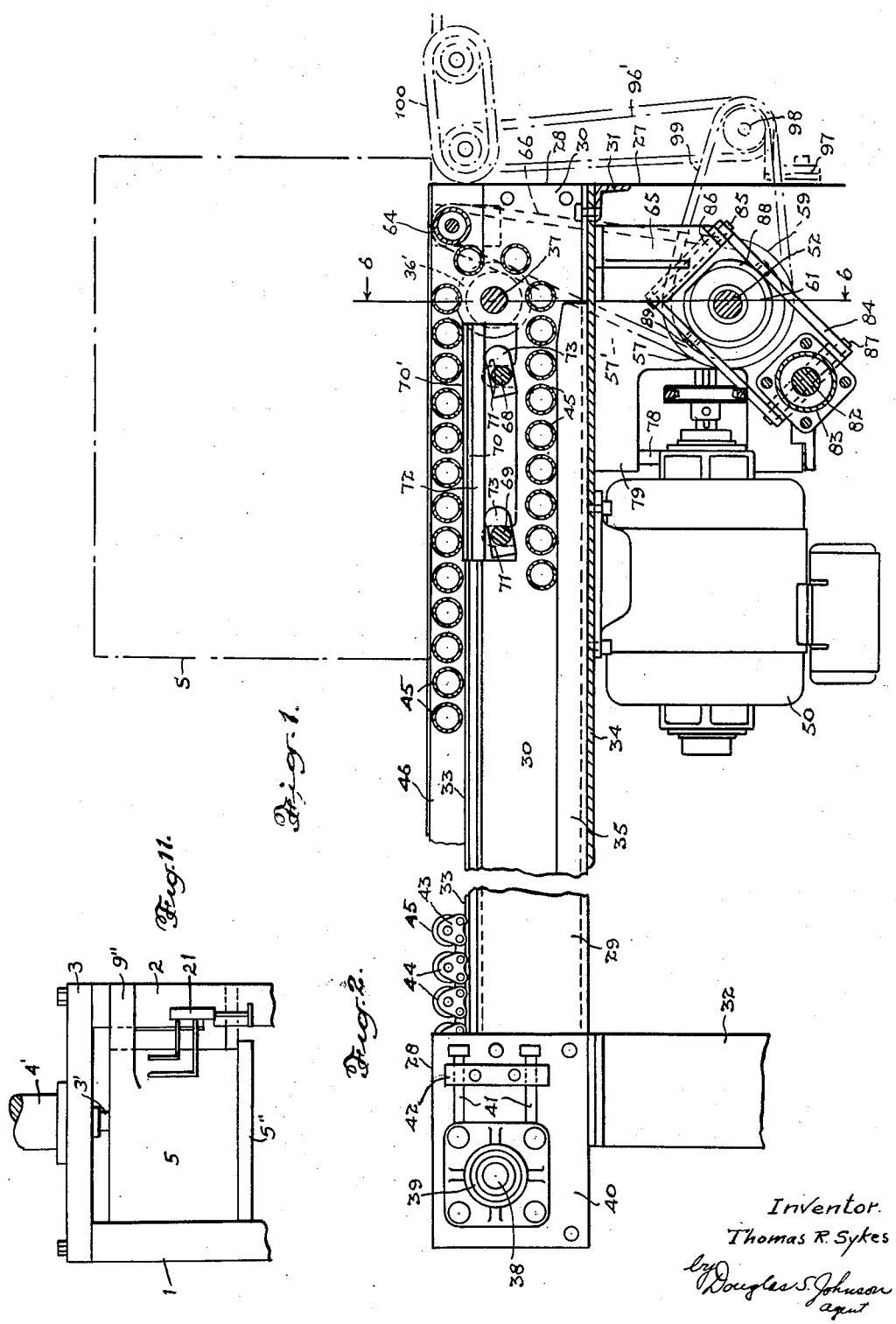
Inventor.
Thomas R. Sykes
by Douglas S. Johnson
agent

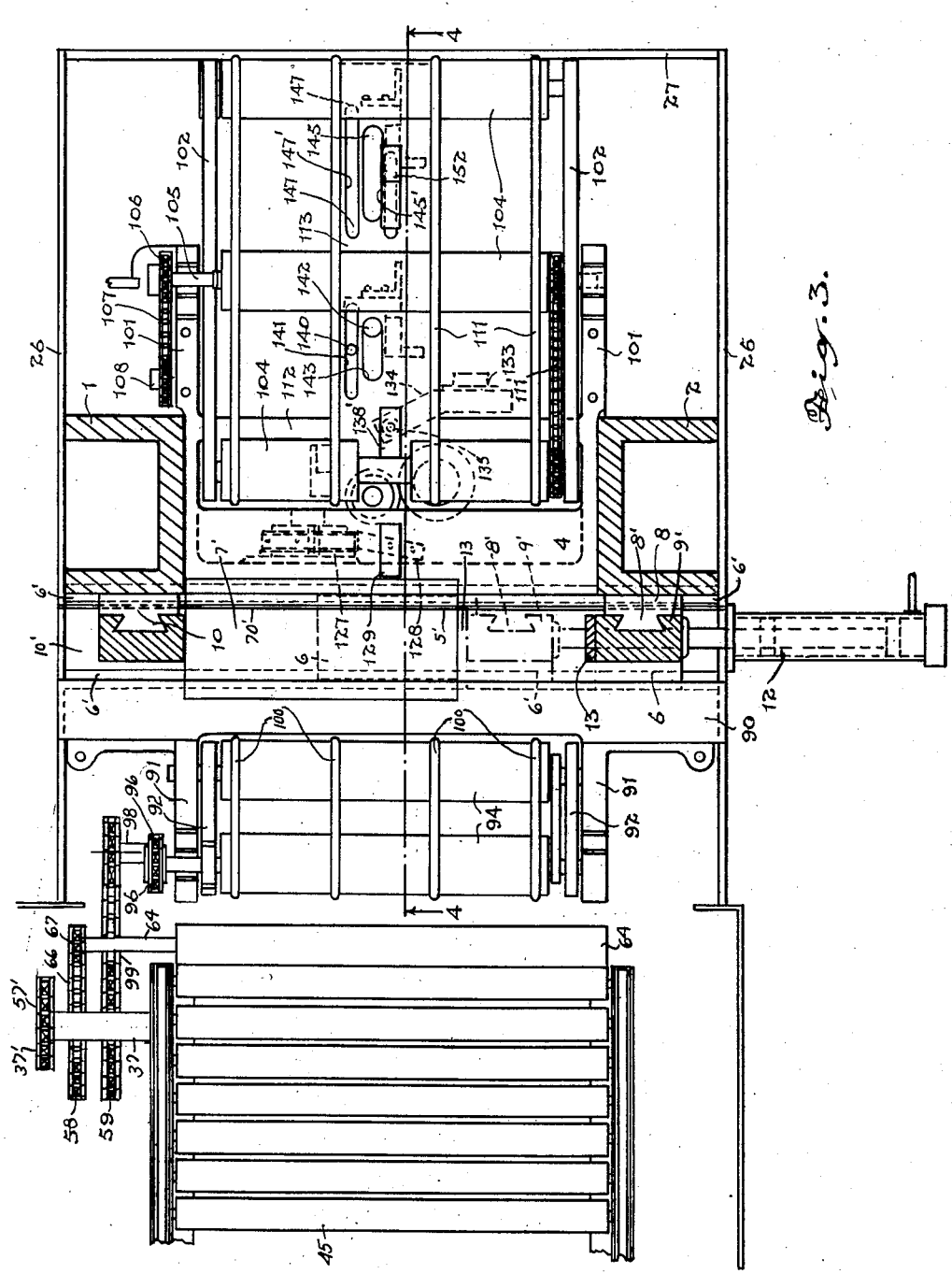

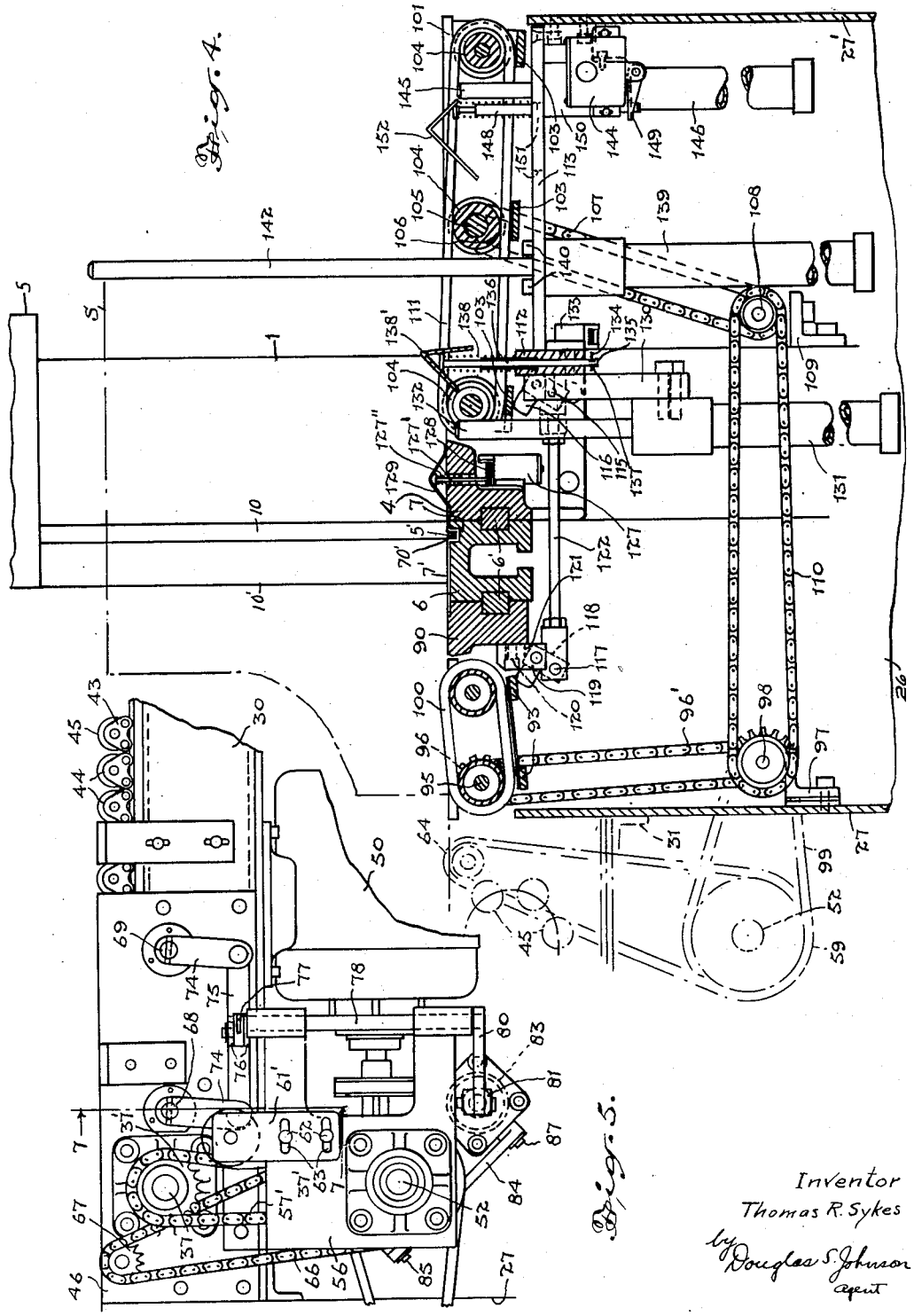

Nov. 25, 1952 T. R. SYKES 2,619,027
AUTOMATIC FEEDER FOR FEEDING MATERIAL
OR ARTICLES THROUGH MACHINES
Filed April 8, 1948 6 Sheets-Sheet 4

Inventor
Thomas R. Sykes
by Douglas S. Johnson
agent

Nov. 25, 1952     T. R. SYKES     2,619,027
AUTOMATIC FEEDER FOR FEEDING MATERIAL
OR ARTICLES THROUGH MACHINES
Filed April 8, 1948     6 Sheets-Sheet 6

Inventor
Thomas R. Sykes

Patented Nov. 25, 1952

2,619,027

UNITED STATES PATENT OFFICE 2,619,027

AUTOMATIC FEEDER FOR FEEDING MATERIAL OR ARTICLES THROUGH MACHINES

Thomas R. Sykes, Toronto, Ontario, Canada, assignor to The Toronto Star Limited, Toronto, Ontario, Canada Application April 8, 1948, Serial No. 19,744

17 Claims. (Cl. 100—4)

1

This invention relates to an automatic feeder device for feeding articles or material through a machine where the movement of the article must be interrupted for a period while in the machine to permit the machine to perform its function, and more particularly, the invention relates to an automatic feeder device for feeding stacked material, packages, cartons or the like, through a bundling or baling machine of the type described in United States Patents Number 2,331,818, October 12, 1943, and Number 2,581,776, January 8, 1952, and co-pending United States application Serial No. 34,528, June 22, 1948, where the machine functions to automatically bind and securely tie bundles or cartons or the like placed therein.

The principal object of the invention is to provide a completely automatic feeder which will maintain a positive and rapid feed through the machine and will stop each bundle stack or article being fed in proper predetermined position in the machine and will thereupon automatically actuate the machine through its operating cycle, and upon completion of the cycle will move the bundle out of the machine and simultaneously advance the succeeding bundle into position to repeat the machine cycle, enabling the machine to be used at its maximum capacity and maximum efficiency, completely eliminating manual control of its operation.

A further important object is to provide an automatic feeder device which will enable the bundles or articles to be delivered through the machine to be fed up to and stored at the mouth of the machine during the interval the machine is tying the preceding bundle, enabling the feeder to be loaded to its full capacity, eliminating completely delays between successive machine cycles.

A still further important object is to provide an automatic feeder device for a bundling or baling machine of the type referred to, which device will be completely synchronized with and will automatically control the machine through its tying cycle in accordance with the delivery thereto and will prevent the machine from operating on interruption of delivery.

A still further and important object is to provide an automatic feeder which can be operated to stop the bundle in a plurality of predetermined positions in the machine and will actuate the machine through its tying cycle following each change in bundle movement to provide several ties on the bundle.

The principal feature of the invention consists in providing, in conjunction with a machine of the type referred to, a roller slat conveyor to deliver bundles to the mouth of the machine, a series of driven rollers in the form of roller tables arranged in the throat of the machine to convey bundles through the machine, stop means arranged to project into the path of the bundles to locate same in predetermined position in the machine, and means for effecting a positive rotation of the rollers of the conveyor adjacent the mouth of the machine to accelerate a bundle onto the driven throat rollers and against the stop means, and providing control means actuated by the entry of a bundle into the machine to start the machine tying cycle, interrupt the positive rotation of the conveyor and throat rollers and clear the stop means from the path of the bundle, the control means being actuated upon completion of the machine cycle to recommence the positive rotation of the conveyor and throat rollers to move the bundle out of the machine and following the discharge of the bundle to introduce the stop means into the path of the succeeding bundle.

A further important feature consists in pivotally mounting the roller tables in the throat of the machine and lowering the tables temporarily out of supporting contact with the bundle following its delivery into the machine and during the machine tying cycle.

A still further feature resides in the novel arrangement for accelerating the bundles from the roller slat conveyor to the driven throat rollers, the arrangement comprising a platform or flat brake shoe actuatable into engagement with the rollers to accelerate bundles placed on the conveyor and passing over the shoe to twice conveyor speed.

A still further feature consists in the novel form of stop mechanism which comprises a solenoid valve-controlled pneumatic cylinder having a piston rod arranged to project into the path of a bundle delivered into the machine upon energization of the conveyor motor and positively operated upon actuation of an electrical switch contacted by the bundle fed into the machine to withdraw from the bundle path and to remain withdrawn until the machine cycle is completed and the bundle is fed beyond the depressed switch.

A still further feature consists in providing a plurality of such stop mechanisms to enable a bundle to be stopped at progressive intervals through the machine between successive machine tying cycles, each stop after withdrawal from the path of the bundle remaining inoperative until the bundle is fed therebeyond.

A still further feature consists in providing a continuously driven roller between the roller slat conveyor and the throat rollers to prevent a wrapper placed beneath the bundle from following the conveyor.

Referring to the accompanying drawings, Figure 1 is a longitudinal mid-vertical sectional view through the roller slat conveyor assembly.

Figure 2 is a side elevational view of the outer end of the roller conveyor.

Figure 3 is a plan view partly in section of the bed plate of a bundling machine used in conjunction with my feeder and illustrating the arrangement of driven throat rollers, bundle stops and switches therefor.

Figure 4 is a mid-vertical sectional view taken on the line 4—4 of Figure 3.

Figure 5 is an elevational view of a portion of the roller slat conveyor taken from the side opposite Figure 2 and showing the brake shoe operating mechanism.

Figure 11 is a fragmentary front elevational view of the upper part of a machine with which the feeder is used, the folder arms and vertical guides therefor being omitted.

The baling or bundling machine in conjunction with which my feeder device is herein illustrated and which is shown and described in the aforesaid patent and co-pending applications comprises primarily the arrangement of co-operating mechanisms whereby a pressure ram operates to engage or compress the material of the bundle upon a fixed bed plate, a length of wire of sufficient length to surround the bundle as determined by the ram is automatically measured and cut after being fed beneath the bundle and is subsequently bent upwardly along the sides of the bundle and then bent inwardly over the top with the ends overlapping, and finally the overlapping wire ends are gripped and welded together to securely "tie" the bundle.

Since the actual details of the machine are elsewhere disclosed as indicated and form no actual part of the invention, the machine is illustrated principally in diagrammatic form.

Figure 8:
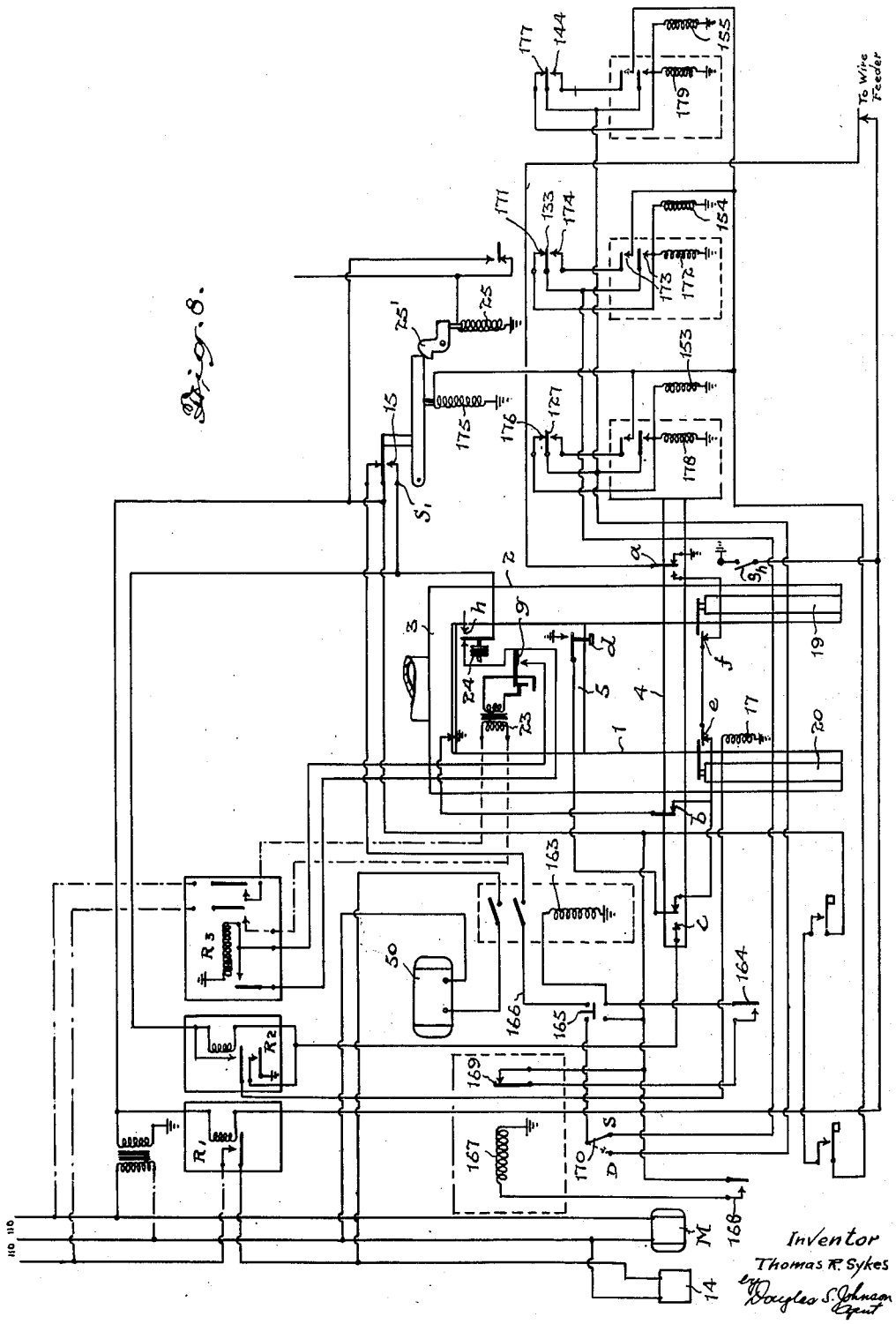
Figure 8 is a schematic wiring diagram of the electrical control system of my feeder as interconnected with the electrical control system of the bundling machine and illustrating the bundling machine diagrammatically.

Referring to Figures 3, 4 and particularly Figures 8 and 11, it will be seen that the bundling or baling machine comprises a pair of uprights 1 and 2 rigidly connected at the top by a cross bar 3 and intermediate their height by a horizontal bed plate 4, Figures 4 and 8.

Operating between the uprights is a hydraulic ram 5 having a forwardly projecting flange 5'' and operated by the piston 3' of the hydraulic cylinder 4' and acting to engage and exert a pressure on a bundle or package placed on the bed plate 4.

A horizontal slide 6 in the form of an inverted channel is mounted on the front edge of the bed plate to slide on rails 6' between the bed plate 4 and a bar 90 and is formed with a groove 7 in its upper surface into which the binder wire is guided to pass under a bundle placed on the bed plate in accordance with the teachings of the above-mentioned applications. Overlying the slide 6 when moved to its extreme left-hand position is a plate 7' formed with a groove 70' to enter the groove 7 and carried by the portions of the bed plate 4 and bar 90 adjoining the slide.

Figures 9, 10:
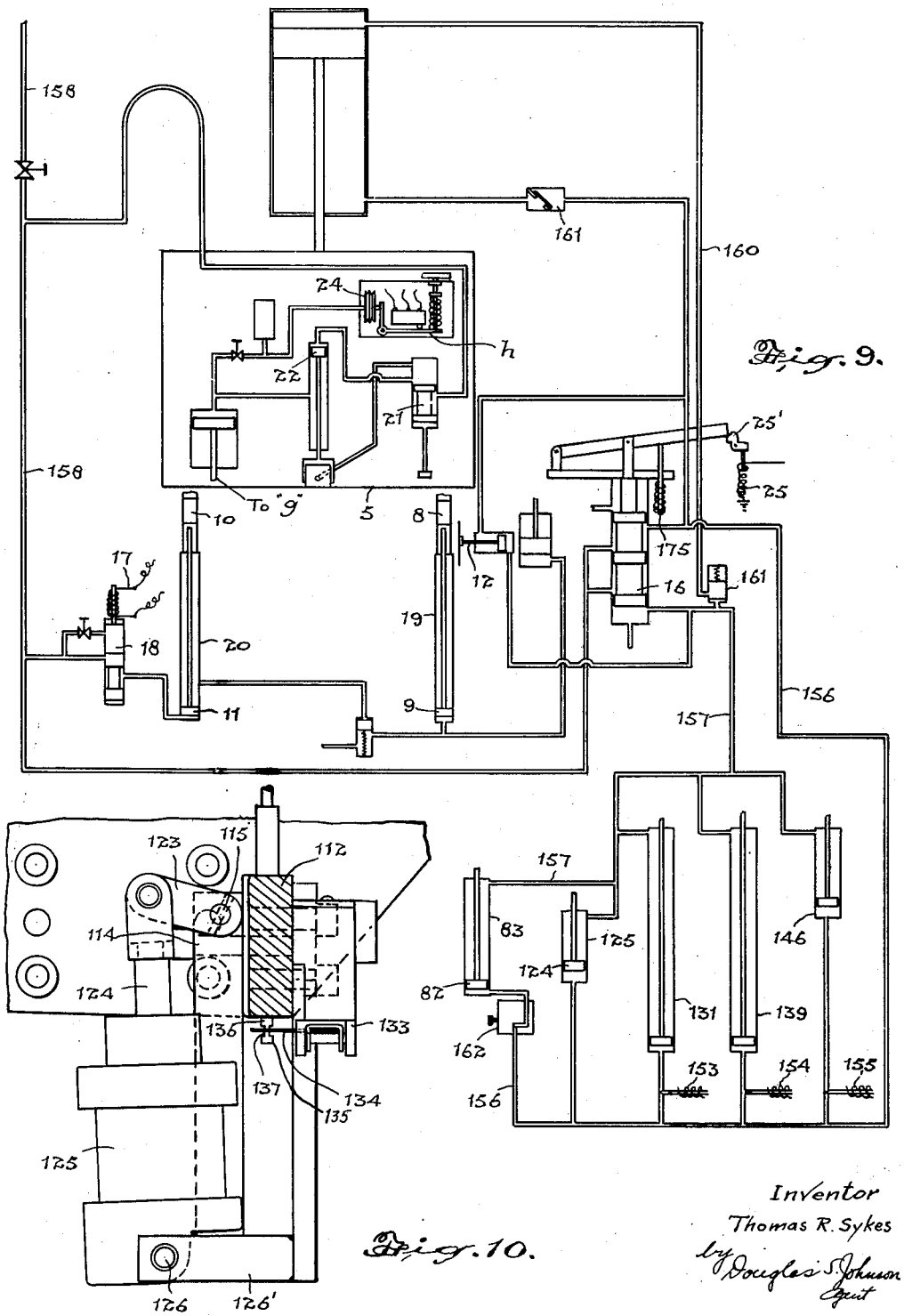
Figure 9 is a schematic diagram of the air circuit of the feeder as inter-connected with the bundling machine.
Figure 10 is an elevational detail of the roller table lifting cylinder.

A wire guide 5' carried by the slide and sliding on the plate 7' serves to maintain continuity of the wire guide groove 7 as the slide 6 is operated across the bed plate. Carried on the slide is a guided vertically slidable grooved folder arm 8 having a dovetailed rib projection 8' engaging in a correspondingly grooved vertical guide 9' carried by the horizontal slide 6 and adapted to be guided at its upper end between the upright 2 and a boss 9'' on the ram, Figure 11. The folder 8 is operated by a piston ram 9 while a similar vertically slidable folder arm 10 moving between the upright 1 and the guide 10' is operated by a piston ram 11 (Figure 9).

Movement of the slide 6 is accomplished through a side action piston ram 12. An upwardly projecting bar 13 carried by the slide 6 and extending upwardly along the inner face of the vertical guide 9' is adapted to engage the bundle and force same against the upright 1 with inward movement of the slide towards the upright 1 under actuation of the ram 12.

The actual functioning of the machine is now briefly described.

Referring to the circuit diagram of Figure 8, it will be seen that the wire feed motor M is continually energized but the wire feed mechanism, not shown, as actuated through a clutch 14 is energized only when relay $R_1$ is energized. Except when the hand control switch $S_h$ is used the energization of $R_1$ depends on the switches $a$, $b$ and $c$ arranged in the path of and operated upon the advance of the wire along the groove 7. The wire normally feeds to $b$ and stops upon opening $b$. When the centre pole of the double throw switch $S_1$ is moved to engage the lower contact 15 the main air valve 16, Figure 9, is also operated to move the ram 5 downwardly and when the ram strikes a bundle the switch $d$ is made to recommence wire feed. Switch $c$ is arranged on a movable mounting (not shown) so that it is movable in the direction of wire feed along the groove 7, and a suitable connection between the switch and ram (not shown) enables the switch to be moved in accordance with the downward movement of the ram 5. Similarly a wire-cutting mechanism, not shown, is moved on the opposite side of the machine in accordance with the ram movement.

Upon the wire reaching and operating switch $c$ to stop the feed, its length between $c$ and the cutting mechanism will be the correct length for the tie. The wire upon striking $c$ will also energize through the operation of $c$ the relay $R_2$.

$R_2$ energizes solenoid 17 which in turn opens the air valve 18, Figure 9, to introduce high pressure air into the folder arm piston ram cylinders 19 and 20 and to operate the wire cutting mechanism not shown.

The folder arms fold the wire about the bundle upon moving upward, at the same time breaking switches $e$ and $f$ in the wire feed circuit to prevent wire from being fed past $a$. Upon reaching the top of the bundle the folder arm mechanisms are adapted to coact with the ram 5 as fully described in application Serial No. 34,528 to turn the wire over the top of the bundle and details of this action are omitted as forming no part of this invention.

The upward movement of the folder arms operates a suitable valve 21 arranged in a path thereof which operates a piston 22 after a predetermined time delay to operate switch $g$, energizing relay $R_3$ which in turn energizes the wire welding transformer 23. During the welding, pressure builds up in a bellows 24 to finally operate switch $h$ to make solenoid 25 which opens the latch 25' holding the center pole of the switch $S_1$ in contact with the contact 15 at the completion of the machine cycle, de-energizing the various circuits described and allowing the main air valve 16 to return to its normal position to operate the ram to its upward position and to allow the folder arms to return to their normal position in preparation for the next bundle.

Secured to the uprights 1 and 2 are side plates or panels 26, Figures 3 and 4, and between these side plates either side of the bed plate 4 are transverse end plates or panels 27 and 27' to house the feeder control mechanism hereinafter described.

The mechanism seen in Figures 1, 2, 6 and 7 for delivering the stacks or packages to be bundled comprises a roller slat conveyor assembly generally designated as 28 which includes a pair of spaced longitudinal channel bars 29 and 30 supported at one end by a bracket angle bar 31 secured to the transverse panel 27 and at the opposite end by legs 32.

The channel bars 29 and 30 have longitudinal guide rails 33 bolted to their upper webs and a bottom plate 34 which carries a pair of longitudinal roller guide rails 35.

Arranged at the ends of the channel bars adjacent the machine in suitable journals 36 is a transverse sprocket carrying shaft 37 on which the sprockets 36' are secured, while at the outer ends of the channel bars is a similar sprocket carrying shaft 38 mounted in slidable journals 39 supported in a frame 40 and adjusted laterally through the screws 41 carried in the bracket plates 42 at either side of the assembly.

Extending between the shafts 37 and 38 is a roller shaft conveyor comprising the spaced endless chains 43 formed of triangular shaped links 44 which inter-engage with and are guided by (Figure 6) the rails 33 and between which are journalled the rollers 45.

Longitudinal side plates 46 are secured to the channels 29 and 30 and carry angle bar brackets 47 to which the conveyor assembly side housing panels 48 are secured and supported on the brackets 47 and extending along the edge of the conveyor adjacent the bundling machine are upwardly extending safety panels or doors 49 which may be hinged as desired, the hinging not being shown.

Figure 6:
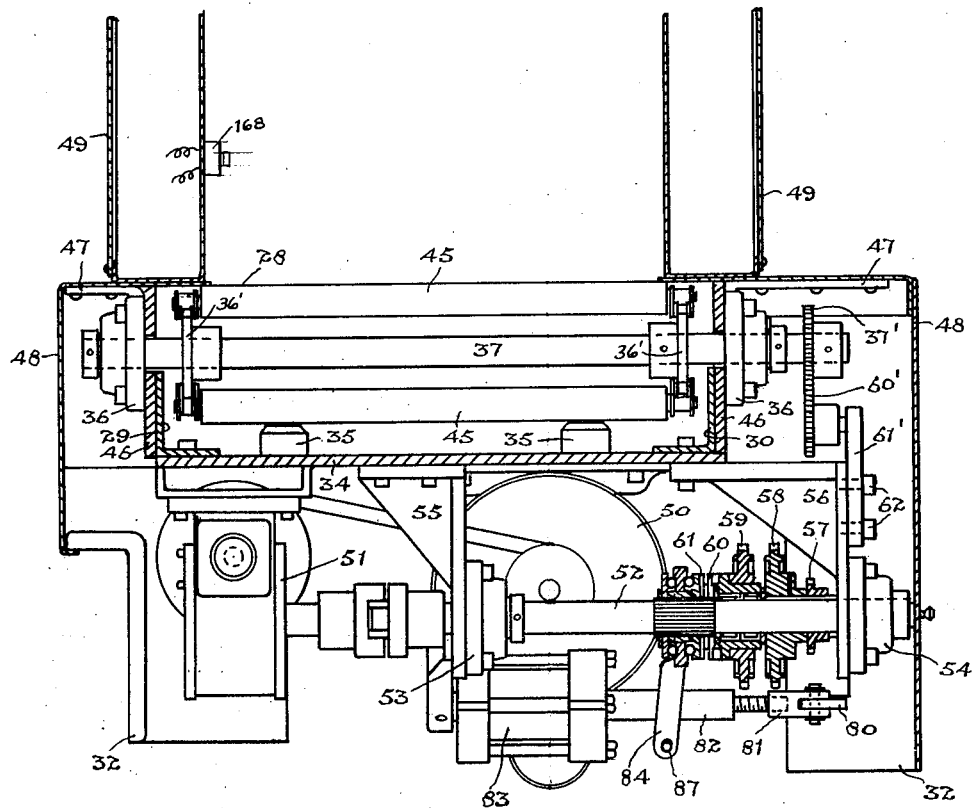
Figure 6 is a transverse vertical sectional view taken on the line 6—6 of Figure 1.
Figure 7:
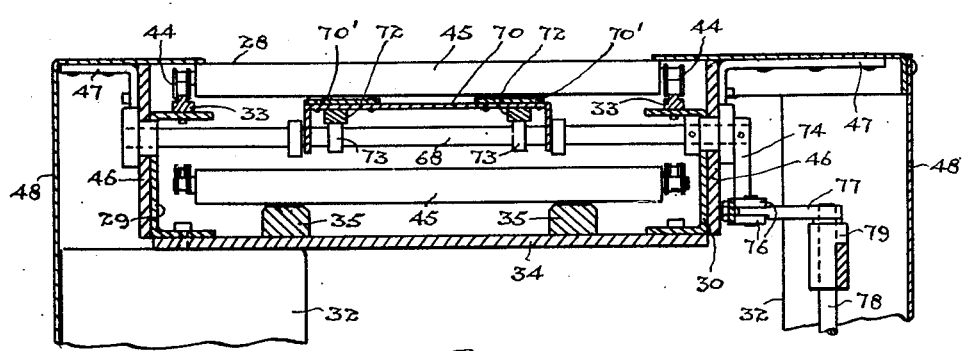
Figure 7 is a transverse vertical sectional view taken on the line 7—7 of Figure 5.

Secured to the underside of the bottom plate 34 is a motor 50, Figures 1 and 6, which operates through a suitable belt drive and gear box 51, a transverse shaft 52 supported in spaced journals 53 and 54 carried on the webbed brackets 55 and 56 respectively secured to the plate 34.

Keyed on the shaft 52 are sprocket wheels 57 and 58 while loosely mounted thereon is a sprocket wheel 59 having a toothed face 60 with which co-operates a clutch 61 splined on the shaft for movement longitudinally thereof.

The sprocket wheel 57 drives the conveyor sprocket shaft 37 through the endless chain 57', which meshes with a sprocket wheel 37' mounted on the shaft 37, and an idler sprocket wheel 60' carried by the plate 61' maintains tension on the drive. The plate 61' is secured to the bracket 56 by bolts 62 passing through the slots 63 in the plate to permit its lateral adjustment.

The sprocket wheel 58 drives a roller 64 mounted on shaft 64' at the end of and preferably slightly above the conveyor between side plates 65 through the endless chain 66 and sprocket wheel 67 mounted on the shaft 64'.

Extending between the plates 46 beneath the upper reach of the roller slat conveyor are a pair of spaced transverse shafts 68 and 69 which support a platform or brake shoe 70. This brake shoe is in the form of an inverted channel member and is provided with notches 71 in its vertical webs to receive the shafts 68 and 69 and with flat longitudinal bars 72 secured to the underside of its horizontal web and engaging cams 73 carried by the transverse shafts, Figure 1.

Secured to the outer ends of the shafts 68 and 69 at one side of the machine are links 74, Figure 5, which are connected at the lower ends by a transverse link 75 pivoted thereto and provided with spaced pivot lugs 76 intermediate its length between which is pivoted a horizontal bar 77 secured to the end of a vertical shaft 78 journalled in journal bosses 79 formed on the bracket 56.

To the lower end of the shaft 78 is secured a horizontal bar 80 which is pivotally secured at its end in a clevis nut 81 arranged on the threaded end of a piston 82 of an air cylinder 83 supported on the bracket 55, Figure 6.

When the piston 82 is in a retracted position in its cylinder the shafts 68 and 69 supporting the brake shoe or platform 70 will be rotated so that the cams 73 are in a substantially horizontal position at which position the platform will be out of contact with the rollers 45 which may rotate as desired. Upon moving the piston 82 outwardly however the shafts 68 and 69 will be rotated through the movement of the horizontal bar 80 which rotates the vertical shaft 78 to impart through the horizontal bar 77 a lateral movement to the link 75 joining the links 74.

The rotation of the shafts 68 and 69 as described raises the brake shoe through the action of the cams 73 engaging the bars 72 so that the friction bars 70' carried on the upper surface of the shoe are forced into engagement with the rollers of the conveyor whereupon the rollers are forced to rotate as they are drawn over the brake shoe. This action of positive rotation and translation of the rotors has the effect of doubling the speed of any article or stack of material placed on the conveyor upon its reaching the brake shoe so that it will be accelerated off the end of the conveyor.

The piston 82 in addition to operating the brake shoe is also utilized to actuate the clutch 61 to drive the loose sprocket wheel 59.

With reference to Figures 1 and 6, a pair of spaced obliquely arranged bars 84 are pivotally supported at their upper ends by a pin 85 journalled in an oblique journal boss 86 provided on the bracket 65, and the lower ends of the bars are connected to the piston 82 by a transverse pin 87.

Mounted on the clutch 61 for free rotation is a ring 88 and this ring carries projections 89 engaged by the bars 84 whereupon movement of the piston swinging the bars 84 about their pivot pin 85 forces the clutch into and out of engagement with the loose sprocket wheel 59 to control its drive, positive drive being obtained when the piston is moved outwardly of the clutch cylinder 83.

The mechanisms and control switches for operating the bundle through the machine following its delivery thereto by the conveyor assembly is shown in Figures 3 and 4. As illustrated, a transverse bar 90 extends across the front or mouth of the machine between the side panels 26 and abutting the slide 6. This bar is provided with a pair of spaced arms 91 between which is pivoted the front roller carriage assembly or table comprising side plates 92 connected by bottom cross bars 93 and rotatably supporting a pair of rollers 94 therebetween. The shaft 95 of one of the rollers 94 extends between and is journalled in the arms 91 and carries on its outer end a sprocket wheel 96.

Arranged below the rollers 94 and supported by a bracket 97 secured to the panel 27 is a sprocket carrying drive shaft 98 which is operated through the endless chain 99 by the sprocket wheel 59 loosely mounted on the driven shaft 52. This shaft 98 drives through the endless chain 96', which engages with the sprocket wheel 96, one of the rollers 94 which in turn drives the other roller 94 through the endless belts 100.

On the opposite side of the machine the bed plate 4 is provided with spaced outwardly extending arms 101 between which is pivoted the rear roller carriage assembly or table comprising side plates 102 connected by the bottom bars 103 and rotatably supporting the three rollers 104 therebetween. In this case the shaft 105 of the centre roller extends between and is journalled in the arms 101 and carries adjacent one end a sprocket wheel 106 which meshes with an endless chain 107 driven by a sprocket carrying shaft 108 supported on a transverse bracket 109.

The shaft 108 is in turn driven through the endless chain 110 by the drive shaft 98.

The end rollers 104 of the roller carriage assembly are driven by the centre roller through the endless belts 111 and chain drive 111' so that rotation of the centre roller effects the rotation of the three rollers simultaneously.

Thus it will be seen that the two roller tables are pivoted for swinging movement about the shafts 95 and 105 and the rollers 94 and 104 of the tables are driven through the clutch operated sprocket wheel 59 of the main drive shaft 52 by means of the drives described. The size of the sprockets utilized in the drive of the rollers 104 are so chosen that the speed of these rollers will be faster than the speed of the rollers 94 so that the speed of the tied bundle leaving the machine will be greater than the speed of the stack to be tied entering the machine through the rotation of the rollers 94.

Extending between the arms 101 below the roller carriage assembly is a transverse bar 112 which is provided adjacent its centre with a horizontal outwardly extending web or platform 113 which extends to the transverse end panel 27'.

Pivotally supported in a bracket 114 carried on the bar 112 is a transverse rock shaft 115 which is provided with a bell crank 116 while a similar rock shaft 117 carrying a bell crank 118 is pivotally supported in a bracket 119 adjustably secured to the transverse bar 90 by the bolt 120 engaging in the vertical bracket slot 121.

The upper ends of the bell cranks 116 and 118 engage the bottom bars 103 and 93 respectively of the roller carriage assemblies remote from their pivots while the lower ends of the bell cranks are pivotally connected to a horizontal rod 122 which is reciprocated longitudinally by the rotation of the shaft 115 through the link 123 pinned thereto and pivotally connected to the piston 124 of the table lifting cylinder 125 pivotally supported at its lower end 126 in the yoke bracket 126'.

The movement of the bell cranks 116 and 118 is therefore coordinated to lift the inner portions of the roller carriage assemblies or roller tables above the bed plate 4 about their pivot shafts 105 and 95 respectively upon outward movement of the table lifter cylinder piston 124, while inward movement of the piston lowers the tables below the bed plate. By adjusting the bracket 119 the actual height to which the front roller table is lifted above the bed plate can of course be controlled.

Arranged below the bed plate 4 is a micro-switch 127 of the single pole double throw type having one normally closed set of contacts.

The switch is provided with a pivoted operating arm 128 which is actuated by a vertical plunger 127' projecting through the bed plate and urged upwardly by a compression spring 127''.

Extending over the head of the plunger is an angled wire or strip 129 which presents a sloping guide or surface to enable the stack projected on to the machine by the rollers 94 to run up over and depress the plunger 127' under its weight to close the normally open contacts and open the normally closed contacts of the switch 127 to start the tying cycle of the machine as hereinafter described.

Supported on a bracket 130 secured to the bar 112 is a bundle stop cylinder 131 provided with a piston or bundle stop 132. The distance between this bundle stop 132 and the wire feed groove 7 is fixed to correspond to the desired minimum distance of the tie from the end of the bundle and this stop is arranged to temporarily project into the path of the bundle stack as it is fed into the machine by the front table rollers 94 to stop the bundle in the correct position for the first tie when the machine is set for "double-tie" as hereinafter described.

Mounted beneath the cross bar 112 is a second micro-switch 133 of the single pole double-throw type similar to the switch 127. The pivoted operating arm 134 of this switch is provided with a slot 135 in its outer end and the operating plunger 136 which extends through the cross bar 112 intermediate its length is provided with an elongated reduced portion 137 adjacent its lower end which enters the slot 135 and slides therein.

The plunger 136 is urged upwardly by the compression spring 138 and carries on its upper end a wire or strip 138' bent into an acute angle and presenting a relatively steep slope at the front to guide the bundle stack up over the top of the plunger to depress same, and presenting a very sharp cut-off at the rear to enable the plunger to come up between successive bundles immediately one bundle is passed therebeyond.

It will be noted that the use of the slotted operating switch arm 134 and the elongated reduced portion 137 of the plunger permits limited vertical movement of the plunger without operating the switch contacts. Thus the initial downward movement of the plunger will not operate the switch and sufficient force must be applied to the plunger to force the main body portion into engagement with the switch arm 134. This arrangement eliminates any accidental operation of the switch upon rebound of the plunger after it springs upward under the action of the spring 138 following the removal of the bundle.

This switch 133 is used for a "single tie" and is energized to operate the machine cycle when the machine is set for single tie as hereinafter described.

Associated with the single tie switch 133 is the single tie stop cylinder 139 which is secured for horizontal adjustment to the horizontal web or platform 113 by the bolts 140 extending through the longitudinal platform slot 141. Operating in the cylinder 139 is a piston or stop 142 which reciprocates through the platform slot 143 and this stop is arranged to temporarily project into the path of the bundle stack as it is fed into the machine by the rollers 94 to stop the bundle in the machine in the correct position for the "single tie." The cylinder is of course adjusted so that the centre of the stack lies over the wire feed groove 7 so that the bundle is bound and tied adjacent its centre.

A similar arrangement of micro-switch 144 and associated bundle stop 145 is provided for the second half of the "double tie" operation and these components are operated in parallel with the switch 127 and stop 133 respectively.

In this case the stop cylinder 146 in which the piston or stop 145 operates is secured to the platform 113 for horizontal adjustment relative the bed plate 4 by the bolts 147 extending through the platform slot 147'. The stop piston 145 reciprocates through the slot 145' and the spring operated plunger 148, corresponding to the plunger 136, for actuating the pivoted operating arm 149 of the switch 144 secured to bracket 150 carried by the cylinder 146, operates through a slot 151 in the platform.

It will be noted that the switch operating plunger 148 is ahead of the stop 145 but is adjusted horizontally therewith and carries on its upper end the bundle contacting angled guide wire or strip 152. This strip 152 has its apex ahead of the plunger so that the plunger is depressed before the bundle actually reaches the plunger to effectively increase the separation between the plunger and bundle stop 145.

Referring to the air circuit diagram, Figure 9, it will be seen that the bundle stop cylinders 131, 139 and 146 which are controlled respectively through the solenoid valves 153, 154 and 155, which are of a type to allow reverse air flow therethrough when not energized, and the clutch operating cylinder 83, and roller table lifting cylinder 125, are all connected in parallel with the slide operating ram 12 by the air lines 156 and 157 connected to the main air valve 16. The ram 5 is also connected in parallel with the slide operating ram 12.

When the main air valve is in its upward or normal position with the bundling machine inoperative, air pressure from the pressure line 158 is directed through the line 156 to move the piston 82 of the clutch cylinder 83 outwardly to positively drive through the sprocket wheel 59 and associated linkage drives the rollers 94 and 104 of the roller tables to raise the brake shoe 70 through its associated linkage against the conveyor rollers to positively rotate same as described.

Simultaneously the piston 124 of the roller table lifting cylinder 125 moves upwardly to lift the tables about their pivots above the bed plate 4.

In addition the desired bundle stop or stops as controlled through the associated solenoid valve comes up into the path of the bundle.

Thus with the air line 156 connected to the pressure source a stack S of newspapers or the like placed on the roller slat conveyor will be fed along the conveyor and will upon reaching the portion of the conveyor above the brake shoe 70 be accelerated at twice conveyor speed onto the driven front table rollers 94 which will force the bundle against the elevated stop.

With the rollers 94 somewhat above the bed plate it will be seen that the feed across the stationary bed plate will be facilitated.

The weight of the bundle will depress the plunger of the switch associated with the particular stop projected into the bundle path and this switch will operate the solenoid 175 by the circuit hereinafter described to operate the switch S to engage the lower contact 15 and to actuate the main air valve 16 to apply air pressure to the line 157 and relieve pressure on the line 156 to start the machine cycle.

The introduction of air pressure into line 157 causes the roller carriage or table lifter cylinder piston 124 to drop lowering roller tables to allow the bundle to rest on the fixed bed plate where the bundle-engaging projection 13 carried by the slide aligns or forces the bundle against the upright 1 as the slide is operated by the outward movement of the side shoving ram 12.

Air is also introduced into the air line 160 connected to the upper part of the ram 5 through the sequence valve 161 which operates as a spring-loaded valve one way and check valve the opposite way so that air flowing to the top of the ram is held back until pressure has been built up in the ram 12 to allow the ram 12 to align the bundle.

Coordinated with the lowering of the roller table lifting piston 124 the bundle stop is lowered and the clutch cylinder piston 82 disengages the feeder clutch 61 to stop the drive of the table rollers 94 and 104, and simultaneously drops the brake shoe 70 from under the rolls of the conveyor.

On completion of the tie the air valve 16 is released by the action of the solenoid 25 and air is exhausted from line 157 and admitted to line 156. Roller table lifter cylinder piston 124 lifts the bundle clear of the fixed bed plate and clutch cylinder piston 82 engages the sprocket wheel 59 to start the table rollers 94 and 104 revolving to carry out the tied bundle and at the same time lifts the brake shoe 70 against the rolls of the conveyor to force any waiting bundle into the machine.

To delay the outward movement of the piston 82 a valve 162 which allows free flow out of the cylinder 83 and restricted flow into the cylinder is connected between the cylinder and the line 156. Adjustment of the restriction of this valve retards engagement of the clutch 61 with sprocket 59 until the ram 5 has started upwardly and the slide 6 moved outwardly to prevent drag on the bottom of the bundle while held by the ram 5.

The bundle stop as controlled by its associated micro-switch does not rise until the bundle has passed, as explained in connection with the electrical circuit, Fig. 8.

As the rollers 104 of the rear roller table operate at a higher speed than the rollers 94 of the front roller table the tied bundle moves away from an incoming bundle, leaving a gap for the stop and associated switch to rise and prepare to repeat the tying operation on the next bundle.

Referring to Figure 8, it will be seen that the bundle feed motor 50 is operated through one contact of a relay 163 which is operated by a feeder door safety switch 164 associated with the feeder door 49 and connected in series with the relay and the centre pole of the switch $S_1$. Thus the motor and feeder operate when the door is closed and stop when it is opened.

A press button switch 165 is provided to short out the door switch 164 to enable the bundle to be fed into the tying position for test purposes.

Upon pressing this switch 165 the circuit through the lead 166 is broken and this acts to prevent the machine from automatically performing its tying cycle.

If desired a time delay relay 167 and associated control switch 168 may be connected in parallel with the safety switch 164. This relay is only used where the stacking of the bundles is so poor that there is likelihood of their jamming between the feeder guard panels or doors 49. When the relay is used each bundle trips and holds closed the control switch 168 during the time the bundle takes to pass this switch, thereby operating the relay 167. Since this relay is of the time delay type the contacts 169 connected in series with the door switch 164 remain closed and only operate after a desired interval.

Each time a bundle trips switch 168 the relay starts its timing cycle and as each bundle passes beyond the switch 168 the relay is de-energized and goes back to the beginning of its timing cycle.

If jamming occurs causing a bundle to hold the switch 168 closed longer than the time delay of the relay, the relay contacts 169 will operate to open the circuit to the motor-operating relay 163 to interrupt the bundle feed which cannot again be started until the jammed bundle is removed.

Connected in series with the upper contact of the switch $S_1$, a second contact of the relay 163 and press button switch 165 is a tie selector switch 170 which when turned to the "single tie" position "S" applies power to the "single tie" micro-switch 133 and through its normally closed contacts 171 to energize the solenoid of the stop cylinder solenoid valve 154 to force the bundle stop 142 up into the path of the bundle and to simultaneously operate the electrical latch-in relay 172 to close its contacts 173.

Switch 133 is operated through the plunger 136 just as the feeder brings a bundle against the stop 142 to apply power through the contact 174 and previously closed relay contacts 173 to the solenoid 175 which operates the mechanical latch-in switch $S_1$, to bring its centre pole into engagement with the lower contact 15 to start the machine cycle and to simultaneously operate the main air valve 16.

The operation of $S_1$ interrupts power to the switch 133 de-energizing relay 172 and solenoid valve 154 which permits the air from the line 157 to depress the stop 142 as previously described.

Following the completion of the weld the solenoid 25 is operated as previously described to release $S_1$ and return the air valve 16 to its normal position.

Power is then again fed to switch 133 but as this switch is still held operated by the bundle depressing the plunger 136, relay 172 and solenoid valve 154 are not operated until the bundle is fed past the plunger. Thus until the bundle has moved beyond the switch 133, the tying cycle cannot operate and the stop 142 cannot rise.

When the switch 133 returns to normal upon removal of the bundle energizing relay 172 and solenoid valve 154, air from line 157 enters through the valve to push the stop up in front of the oncoming bundle and the machine is set to repeat the tying cycle.

When the tie selector switch 170 is turned to the "double tie" position "D," power is applied to the micro-switches 127 and 144 connected in parallel and these switches operate through their normally closed contacts 176 and 177, respectively, the electrical latch-in relays 178 and 179 and solenoid valves 153 and 155, respectively.

The valves 153 and 155 permit pressure air to enter the stop cylinders 131 and 146 as described, to project the bundle stops 132 and 145 associated therewith into the path of the bundle.

An oncoming bundle delivered by the feeder is stopped by the first stop 132 controlled by the solenoid valve 153, and micro-switch 127 is operated through the plunger 127' to supply power through the closed contacts of the relay 176 to the solenoid 175 to operate $S_1$ to start the machine tying cycle and to de-energize the switches 127 and 144.

A tie is then formed around the leading end of the bundle and the stops 132 and 145 are retracted from the path of the bundle.

Upon completion of the tie $S_1$ will be operated by the solenoid 25 to again apply power to the micro-switches 127 and 144. Since the plunger 127' associated with switch 127 is depressed relay 178 and solenoid valve 153 will not be operated and bundle stop 132 will not come up. On the other hand the plunger 148 associated with the switch 144 will be up and power will flow through the normally closed switch contacts 177 to close the relay 179 and solenoid valve 155 to project the stop 145 into the path of the bundle and prepare the machine for the next tying cycle.

As the bundle moves against the stop 145 the switch 144 will be operated through its plunger 148 to again energize solenoid 175 to repeat the machine cycle to provide a second tie adjacent the opposite end of the bundle.

During the second tie both the plungers 127' and 148 are depressed and after the tie the feeder moves the bundle out of the machine and allowing first the switch 127 and later switch 144 to return to normal, operating their associated stops and relays.

During the double tie the single tie circuit is of course de-energized.

Briefly the operation of the feeder is as follows: A bundle placed manually on the roller slat conveyor or transferred thereto from another conveyor is carried into the machine. As it approaches the throat of the machine the side panels 49 turn up the sides of a wrapper placed beneath the bundle, and near the end of the conveyor the rollers ride up on the brake shoe 70 and the bundle is accelerated onto the front roller table including the rollers 94. The driven roll 64 at the end of the conveyor prevents the bundle wrapper from following the conveyor rollers.

The bundle then passes over the fixed bed plate 4 onto the rear roller table including the rollers 104. With the arrangement of the roller tables higher than the fixed tables the bundle is readily projected across the stationary bed plate to strike the projecting stop, and to depress the switch associated therewith.

Following depression of the stop switch the machine tying cycle is started the roller tables are lowered by the table lifter cylinder 125 to permit the side action ram 12 to align the bundle. At the same time the stop is retracted from the path of the bundle and the feeder clutch cylinder 83 disengages the clutch 61, driving the roller tables and drops the brake shoe 70 on the roller slat conveyor.

The conveyor and small driven rollers continue to run, bringing the next bundle up against the one being tied. Since the rollers on the conveyor are free to turn under this bundle it can stop when it abuts the preceding bundle.

When the tie is complete the machine returns to its normal inoperative position and at the same time the lifter cylinder lifts the roller tables and bundle clear of the bed plate, the feeder clutch cylinder engages the clutch to drive the roller tables and lifts the brake shoe against the conveyor rollers. The tied bundle is thus moved out of the machine and the next bundle moved in, accelerated by the rollers rolling on the brake shoe.

Since the surface speed of the rear roller table is greater than the front roller table the tied bundle moves away from the incoming bundle to leave a gap therebetween to enable the bundle stop switch to rise between the bundles to permit the bundle stop to come up. Depressing of the switch again repeats the tying cycle as described.

Thus it will be seen that bundles can be stored on the conveyor and will be fed up to and abut the bundles in the machine while it is being tied and will upon completion of the tie be projected into the machine while the tied bundle is ejected. The whole operation of bundle feed and the synchronized machine functioning is completely automatic so that the machine will bundle at its maximum capacity without manual operation or attention, and no time delay will occur between the ejection of the tied bundle and the introduction of the succeeding bundle which automatically trips the machine cycle as it moves into position. The bundle stop cylinders 139 and 146 can of course as described be readily adjusted to provide the tie at the desired point.

While I have particularly described my automatic feeder for use in conjunction with a bundling or baling machine, it will be understood that it may readily be used in conjunction with any machine or operation where it is desired to have the articles or materials to be conveyed to stop for a period during which the machine functions or the operation is carried out.

What I claim as my invention is:

1. An automatic feeder for feeding material or articles through a machine, comprising in combination with the machine a roller slat conveyor terminating adjacent the machine and comprising a series of bodily movable rollers each independently rotatable, means for imparting positive rotation to the rollers of the conveyor arriving adjacent the machine to accelerate material being fed along the conveyor into the machine, control means actuated by the entry of material into the machine for effecting the release of said roller rotating means from rotating said rollers for an interval while the material is in said machine, and means for moving the material out of the machine at the end of the interval for which said roller rotating means are released.

2. An automatic feeder for feeding material or articles through a machine, comprising in combination with the machine a roller slat conveyor terminating adjacent the machine and comprising a series of bodily movable rollers each independently rotatable, brake means for imparting positive rotation of the rollers of the conveyor arriving adjacent the machine to accelerate material being fed along the conveyor into the machine, means for operating said brake means into and out of operative roller rotating relation, control means actuated by the entry of said material into the machine to operate the machine and to operate said brake-operating means to move said brake means of roller rotating relation during machine operation to permit the rollers to rotate freely, and means operable upon completion of machine operation to move the material out of the machine.

3. An automatic feeder for feeding a quantity of material or articles through a machine comprising in combination with the machine, an endless moving roller slat conveyor having slat rollers independently rotatable for feeding material to the machine, a brake shoe arranged beneath the upper reach of the conveyor adjacent the machine and actuatable into and out of engagement with the conveyor rollers arriving adjacent the machine, means operatively connected with said brake shoe for normally maintaining the brake shoe in engagement with rollers arriving adjacent the machine to accelerate the material being fed along the conveyor into the machine, control means actuated by the entry of said material into the machine to initiate machine operation and to operate said brake shoe operating means to move the brake shoe out of roller braking relation during machine operation, and means for moving the material out of the machine at completion of machine operation.

4. A feeder device as claimed in claim 3 in which stop means are provided to stop the material in predetermined position in the machine, said stop means being operable to withdraw from the path of the material to an inoperative position subsequent to stopping same, and being actuated upon the movement of the material out of the machine to return to its operative position.

5. An automatic feeder for feeding material or articles through a machine comprising the combination with the machine, of an endless moving roller slat conveyor having slat rollers independently rotatable for feeding material to the machine, a brake shoe arranged beneath the upper reach of the conveyor adjacent the machine, cam means for moving said brake shoe into and out of frictional braking engagement with the rollers arriving adjacent the machine, means for actuating said cam means and normally maintaining said brake shoe in roller braking relation to accelerate the material being fed along the conveyor into the machine, stop means to locate the material fed into the machine, control means actuated by the entry of the material into the machine to operate the machine and, to operate said cam actuating means to move said brake shoe out of roller braking relation, and to withdraw said stop means to an inoperative position, and means operated at the completion of machine operation for moving the material out of the machine, the cam-actuating means being operated at the completion of machine operation to return said brake into roller braking relation and the stop means being operated upon movement of the material out of the machine to return to its operative position.

6. An automatic feeder for feeding material or articles through a machine and to interrupt feed for a period during which the machine is operated following introduction of an article into the machine comprising the combination with the machine, of an endless moving roller slat conveyor having slat rollers independently rotatable for feeding material to the machine, a brake shoe arranged beneath the upper reach of the conveyor adjacent the machine, means for actuating said brake shoe into and out of braking engagement with the conveyor rollers arriving adjacent the machine and normally maintaining the brake shoe in roller braking relation to accelerate the material fed along the conveyor into the machine, stop means for locating the material in the machine, driven rollers arranged in the throat of the machine to project the material against said stop means, and control means actuated upon entry of the material into the machine to, operate the machine, operate said brake shoe actuating means to move the brake shoe out of roller braking relation, interrupt the drive of said driven throat rollers, and withdraw said stop means to an inoperative position, said throat rollers and said brake shoe actuating means being operated at the completion of machine operation to move the material out of the machine and to introduce succeeding material into the machine, said stop means being actuated upon the movement of the material out of the machine to return to its operative position to stop the succeeding material.

7. The combination with a bundling machine including an air operating circuit, a main air control valve movable to a machine operating position, and means for returning the air valve to a normal position maintaining the machine from operation at the conclusion of a machine operation cycle, of an endless moving roller slat conveyor having slat rollers independently rotatable for feeding bundles placed thereon to the machine, a motor operatively connected with said conveyor, a brake shoe arranged beneath the upper reach of the conveyor and movable into and out of braking engagement with the conveyor rollers arriving adjacent the machine, air operated means connected in said air circuit and operatively connected with said brake shoe and normally maintaining the brake shoe in roller braking engagement to accelerate bundles reaching said brake shoe into the machine, air-operated stop means arranged to normally project into the path of the bundle accelerated into the machine, a solenoid valve controlling the operation of said stop means, rollers arranged in the throat of the machine to move the bundle through the machine, drive means for said throat rollers, air-operated clutch means normally connecting said roller drive means with said motor, an electrical control circuit including said solenoid valve, and a switch associated with said control circuit actuated by the entry of a bundle into the machine to; operate said main air valve to effect operation of the machine cycle and the operation of the aforesaid air-operated means to move the brake shoe out of roller braking engagement, interrupt the drive of said throat rollers and withdraw said stop means from the bundle path and to effect the de-energization of said control circuit, said main air valve upon being returned to a normal position by said first-mentioned control valve returning means effecting the recommencement of the drive of said driven throat rollers and the operation of said brake shoe into roller-engaging relation to move the bundle out of the machine and introduce a succeeding bundle into the machine, the movement of the bundle out of the machine releasing said switch to re-energize said control circuit to prepare the machine for a subsequent operation and to operate said solenoid valve to introduce said stop means into the path of said succeeding bundle.

8. The combination with a bundling machine including an air-operating circuit, a main air control valve, an electrical control circuit, an operating latch-in means for operating said main air valve and energizing said control circuit, and means for releasing the aforesaid latch-in means following machine operation to return said air valve to a normal position and de-energize said control circuit to maintain the machine from operation, of an endless moving roller slat conveyor having slat rollers independently rotatable for feeding bundles placed thereon to the machine, a motor operatively connected with said conveyor, a brake shoe arranged beneath the upper reach of the conveyor and movable into and out of braking engagement with the conveyor rollers arriving adjacent the machine, an air cylinder connected in said air circuit, a piston operating in said cylinder and operatively connected to said brake shoe to normally maintain same in roller braking engagement to accelerate bundles reaching said brake shoe into the machine, an air cylinder connected in parallel with the aforesaid cylinder, a bundle stop piston operating in said cylinder and normally maintained in the path of the bundle accelerated into the machine, a solenoid valve associated with said bundle stop cylinder, rollers arranged either side of the machine, drive means for said latter rollers, clutch means operatively connected with the piston of said first-mentioned cylinder and normally connecting said roller drive means with said motor, an electrical control circuit including said solenoid valve, and a switch associated with said control circuit and actuated by the entry of a bundle into the machine to operate said latch-in means to operate said control valve to operate said cylinder pistons to move the brake shoe out of braking engagement with the conveyor rollers, interrupt the drive of said driven rollers and withdraw said stop piston from the bundle path and de-energize said latter electrical control circuit, said latch-in means upon being returned to a normal position by said latch-in releasing means effecting the operation of the piston of the first-mentioned cylinder to recommence the drive of said driven rollers and the operation of said brake shoe into roller-engaging relation to move the bundle out of the machine and introduce a succeeding bundle into the machine, the movement of the bundle out of the machine releasing said switch to re-energize said control circuit associated therewith to prepare the machine for subsequent operation and to operate said solenoid valve to introduce said stop piston into the path of the said succeeding bundle.

9. A device as claimed in claim 8 wherein a continuously driven roller is arranged between the end of the conveyor and said driven rollers to prevent a wrapper placed beneath the bundle from following said conveyor.

10. The combination with a bundling machine of the type described including a reciprocating ram, an air operating circuit, a main air control valve, an electrical control circuit, an operating latch-in means for operating said main air valve and energizing said control circuit to operate the machine, and means for releasing the aforesaid means at the completion of machine operation to return said air valve to a normal position and de-energize said control circuit, of an endless moving roller slat conveyor having slat rollers independently rotatable for feeding bundles or the like placed thereon to the machine, a motor operatively connected with said conveyor, a brake shoe arranged beneath the upper reach of the conveyor and movable into and out of braking engagement with the conveyor rollers arriving adjacent the machine, an air cylinder connected in said air circuit in parallel with said ram, a piston operating in said cylinder and operatively connected to said brake shoe to normally maintain same in roller braking engagement to accelerate bundles reaching said brake shoe into the machine, roller tables arranged either side of the machine, drive means for driving the rollers of said roller tables to carry a bundle accelerated into the machine through the machine, a clutch operated by said piston and normally connecting said roller table drive means with said motor, a plurality of air cylinders connected in parallel with the aforesaid cylinder arranged in aligned spaced relation beneath the roller table on the side of the machine remote from the conveyor, solenoid valves for controlling air flow into said latter cylinders, stop pistons operating in said latter cylinders and arranged to normally project above said roller tables upon operation of the associated solenoid valve to stop a bundle in the machine, an electrical feeder control circuit, a selector switch for selectively including said solenoid valves in said feeder control circuit, and a switch associated with each of said solenoid valves and projecting above said roller tables, the switch associated with a solenoid valve selected being actuated by contact with a bundle entering the machine to operate said latch-in means to operate the machine, operate said brake shoe and clutch operating piston to move the brake shoe out of roller braking engagement and to interrupt the drive of said roller tables, withdraw the stop pistons from the path of the bundle, and to de-energize the feeder control circuit, said latch-in means upon being returned to a normal position by said latch-in releasing means operating said brake shoe and clutch operating piston through said air circuit to recommence braking of the conveyor rollers and drive of said roller tables and to introduce into the bundle path any stop piston whose controlling solenoid valve is included in the control circuit by said selector switch and whose solenoid actuating switch is not engaged by the bundle in the machine.

11. A device as claimed in claim 10 in which at least some of said stop cylinders are horizontally adjustable relative the machine.

12. A device as claimed in claim 10 in which the bundling machine includes a bundle aligning side action ram and the roller tables are pivotally supported to swing above and below the bed plate of the machine and an air cylinder is connected in parallel with said side action ram and having a piston operatively connected to swing said roller tables, said piston normally maintaining said tables above said bed plate and being operated upon operation of said latch-in means to lower said roller tables below said bed plate, and a check valve associated with said last-mentioned cylinder to delay the rise of said roller tables upon completion of the operation of the machine.

13. In an automatic feeder for a bundling machine having an electrical control circuit, a main latch-in switch movable to energize said control circuit, and means to release said switch following a machine bundling operation to de-energize said control circuit, a control circuit for said feeder connected to said main switch and normally energize with said switch in released position, a microswitch having a set of normally closed contacts and a set of normally open contacts arranged in said feeder control circuit, a bundle stop, a cylinder valve solenoid for said stop and an electrical latch-in relay connected with said normally closed switch contacts, a solenoid arranged to operate said main switch connected with said normally open switch contacts, operating contacts associated with said relay interposed between said switch operating solenoid and said normally open switch contacts and normally closed following the energizing of said relay, and a plunger operated by the feed of a bundle into the machine to open said normally closed microswitch contacts and to close said normally open microswitch contacts to energize said switch operating solenoid operating said main switch to operate the machine and de-energizing said feeder control circuit and allowing said relay operating contacts to open.

14. A control circuit as claimed in claim 13 in which a second feeder control circuit is provided comprising a pair of microswitches connected in parallel and connected thru normally closed contacts with a pair of bundle stop cylinder solenoids and a pair of electrical latch in relays and having normally open contacts connected through operating contacts of said relays with said switch operating solenoid, means associated with each of said latter microswitches, and switch means for selectively energizing said feed control circuits.

15. A device as claimed in claim 13 in which said microswitch is provided with an operating arm having a slot, and said plunger is spring urged to project into the path of the bundle and has an intermediate reduced portion engaging in said slot and permitting limited movement of said plunger before operating said switch.

16. A device as claimed in claim 13 having a safety switch, a relay energized upon the closure of said safety switch provided with operating contacts connected in said feeder control circuit, a time delay relay arranged to de-energize said last mentioned relay to open its operating contacts and switch means projecting into the path of bundles being fed by said feeder and actuatable upon contact with a bundle to energize said time delay relay.

17. In an automatic feeder for a bundling machine, an electrical control circuit including a switch having normally closed contacts and normally open contacts, means actuated by the feed of a bundle into the machine to open said normally closed contacts and close said normally open contacts, a bundle stop, a controlling solenoid for said stop and a latch-in relay connected to said normally closed switch contact and normally energized, operating contacts associated with said latch-in relay a machine operating control associated with said control circuit, a solenoid for actuating said machine operating control connected in series with said relay operating contacts and said normally open switch contacts, and means for de-energizing said control circuit.

THOMAS R. SYKES.

REFERENCES CITED

The following references are of record in the file of this patent:

UNITED STATES PATENTS

| Number | Name | Date |
| --- | --- | --- |
| 1,861,963 | Jennings et al. | June 7, 1932 |
| 1,967,638 | Von Reis | July 24, 1934 |
| 2,331,818 | Wallace | Oct. 12, 1943 |